United States Patent [19]

Crouch

[11] Patent Number: 4,926,602
[45] Date of Patent: May 22, 1990

[54] EDGE SANDER HAVING ADJUSTABLE SUPPORT TABLE OR TABLES

[76] Inventor: Robert H. Crouch, 7 Lakes Box 578, West End, N.C. 27376

[21] Appl. No.: 385,580

[22] Filed: Jul. 27, 1989

[51] Int. Cl.⁵ .............................................. B24B 21/10
[52] U.S. Cl. ................................ 51/135 R; 51/240 A; 269/60
[58] Field of Search ............ 51/135 R, 238 R, 240 R, 51/240 T, 240 A; 269/60, 71, 75, 45

[56] References Cited

U.S. PATENT DOCUMENTS

| | | | |
|---|---|---|---|
| 1,938,548 | 12/1933 | Tautz | 51/240 A |
| 2,409,415 | 10/1946 | Blomquist | 51/240 A |
| 2,700,992 | 2/1955 | Grzybowski | 51/240 A |
| 2,723,506 | 11/1955 | Paynton | 51/238 R |
| 2,724,934 | 11/1955 | Urquhart | 51/240 A |
| 3,884,122 | 5/1975 | Chernov et al. | 51/240 T |
| 4,228,618 | 10/1980 | Jensen | 51/240 A |
| 4,257,195 | 3/1981 | Appelgren | 51/238 R |
| 4,259,814 | 4/1981 | Glaser et al. | 51/240 A |
| 4,346,536 | 8/1982 | Bryden . | |
| 4,532,735 | 8/1985 | Dahlgren et al. | 51/56 R |

Primary Examiner—Frederick R. Schmidt
Assistant Examiner—Mark F. Frazier
Attorney, Agent, or Firm—Watson, Cole, Grindle & Watson

[57] ABSTRACT

A belt sanding apparatus has an endless abrasive belt trained over both a drive and a driven roll for finishing a workpiece, the rolls being mounted on the apparatus frame for rotation about fixed upstanding axes. A side and/or end workpiece support table is mounted on the frame for four-way adjustment relative to the belt. An elongated support bracket plate is provided for mounting each table to the frame for pivotal movement about a transverse tilt axis. Guide rods on the table engage the bracket plate for vertical sliding movement and for effecting pivotal movement of the table about the transverse tilt axis. A turnscrew or the like is provided on the bracket for vertically moving the table relative to the belt, the table being connected to the guide rods for moving the table both along a horizontal plane toward and away from the belt and about a longitudinal roll axis, such that the table is capable of vertical, horizontal, tilt and roll adjustments relative to the belt.

11 Claims, 2 Drawing Sheets

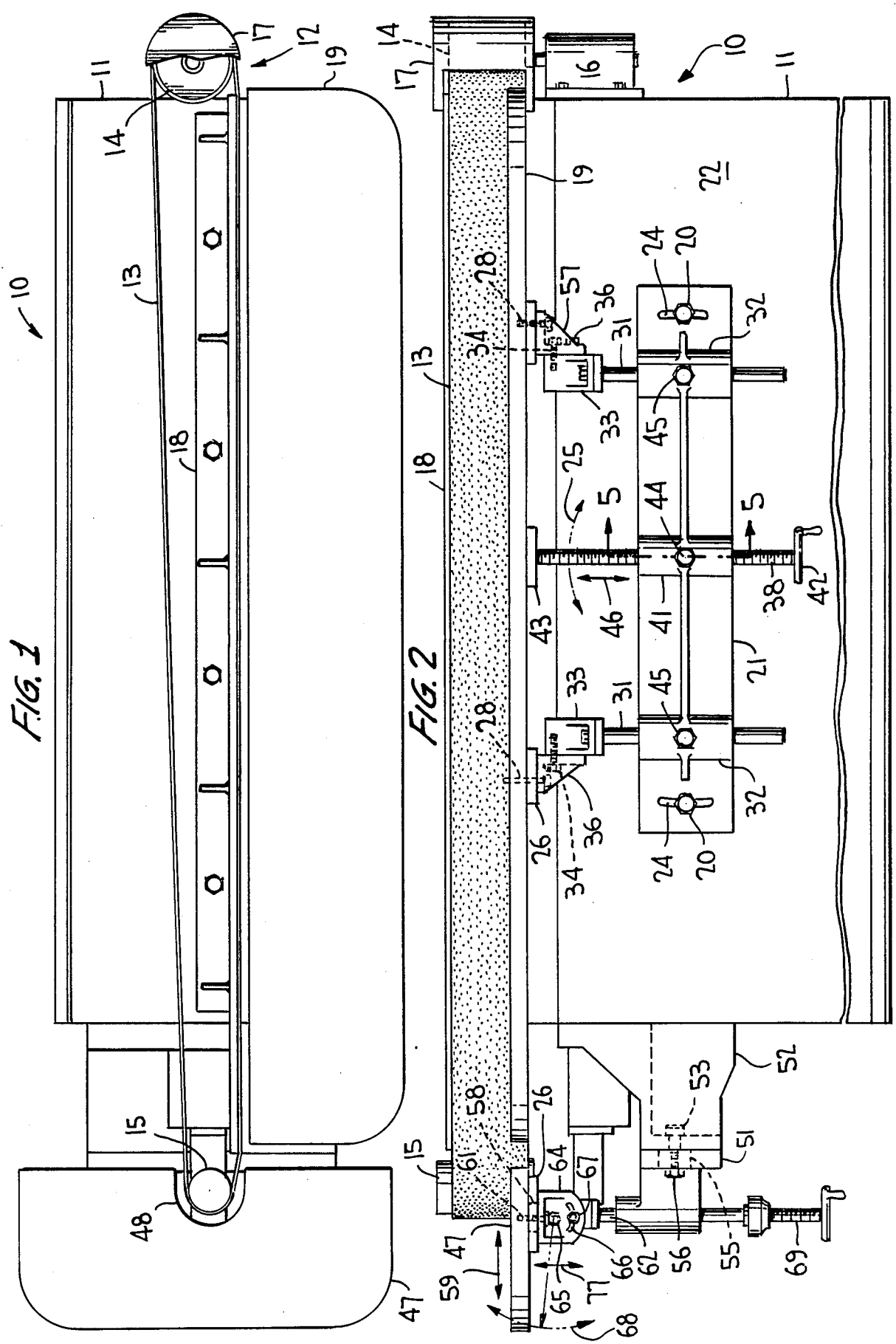

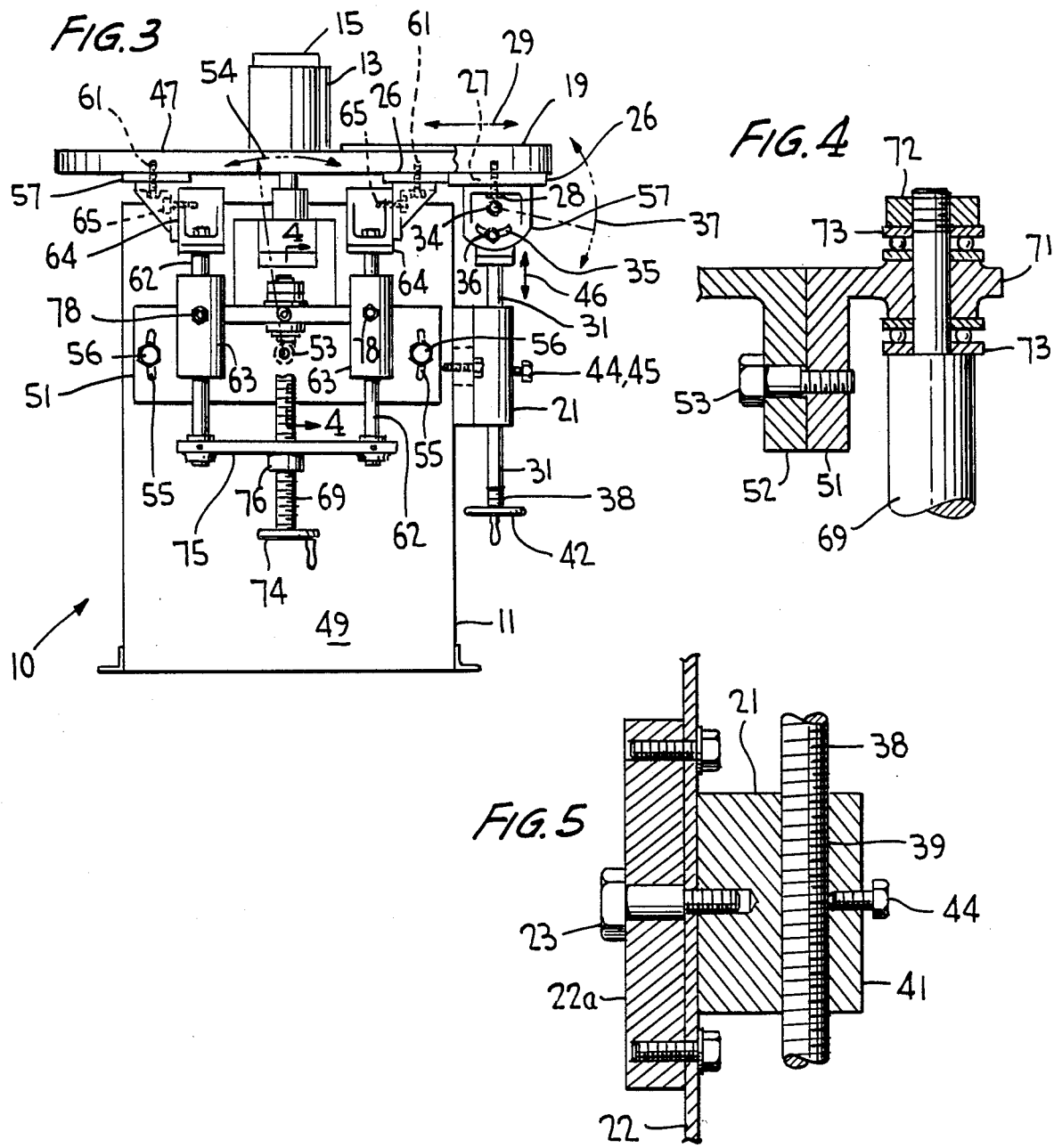

EDGE SANDER HAVING ADJUSTABLE SUPPORT TABLE OR TABLES

BACKGROUND OF THE INVENTION

This invention relates generally to a belt sanding apparatus having an endless abrasive belt trained over both a drive and a driven roll for finishing a workpiece, and more particularly to such an apparatus having at least one workpiece support table located along a side and/or an end of the apparatus frame, the support table or tables being mounted to the frame for four-way adjustment relative to the belt. The or each table is capable of vertical, horizontal, tilt and roll adjustments relative to the belt.

U.S. Pat. No. 4,346,536 discloses a belt sander having a side workpiece support table capable of horizontal, vertical and roll adjustments relative to an endless sanding belt which is itself mounted on the frame for adjustment along a transverse axis and about a longitudinal axis relative to the work table. This prior art apparatus is, however, incapable of having the workpiece table adjusted about a transverse tilt axis so as to present as large an abrasive surface of the belt as possible to the workpiece during operation. Moreover, the workpiece table adjustments require rather complex procedures and cannot be accurately made.

SUMMARY OF THE INVENTION

It is therefore an object of the present invention to provide a belt sanding apparatus having a side and/or an end workpiece support table capable of four-way adjustment relative to the belt, in a simple, accurate and highly efficient manner, the apparatus being constructed with a minimum number of parts rendering it highly economical to produce and easy to operate. The workpiece table adjustments include uniquely arranged vertical, horizontal and roll adjustments relative to the belt, and in addition includes a tilt adjustment about a transverse axis of the workpiece table thereby presenting a variable abrasive area of the sander to the workpiece for rendering the apparatus more versatile and extending the life of the normally expensive sanding belts.

In accordance with the invention, the workpiece support table is mounted on either a side of the frame, along an end of the frame, or along both the side and end of the frame, using an elongated support plate mounted for pivotal movement about a transverse tilt axis. Guide rods extend from the table and engage the bracket for vertical sliding movement and for effecting pivotal movement of the table about the transverse tilt axis. The table is clamped to bracket elements for relative horizontal adjustment of the table to the sander. These bracket elements are in turn clamped to further bracket elements on the guide rods for adjustment of the table about a longitudinal roll axis relative to the sander. Vertical adjustment to the table is effected by the provision of a simple turnscrew which can be manually operated for accurate adjustment.

In one embodiment, the turnscrew threadedly engages a collar on the bracket plate and its free end bears against an underside of the worktable for effecting vertical adjustment as the table is accurately guided up and down by the guide rods sliding in collars on the bracket plate.

In another embodiment, the turnscrew is mounted on the bracket plate for rotation about its transverse axis, but without translation, the turnscrew being connected through a transverse bar to the guide rods for adjusting the table up and down in an accurate manner as the guide rods slide within collars on the bracket plate.

Other objects, advantages and novel features of the invention will become more apparent from the following detailed description of the invention when taken in conjunction with the accompanying drawings.

BRIEF DESCRIPTION OF THE DRAWINGS

FIG. 1 is a top plan view of the belt sanding apparatus of the invention showing both the side and end workpiece tables mounted on the apparatus frame;

FIG. 2 is a side elevational view of the apparatus of FIG. 1;

FIG. 3 is an end elevational view of the apparatus of FIG. 1;

FIG. 4 is a cross-sectional view, at an enlarged scale, taken substantially along the line 4—4 of FIG. 3; and FIG. 5 is a cross-sectional view, at an enlarged scale, taken substantially along the line 5—5 of FIG. 2.

DETAILED DESCRIPTION OF THE INVENTION

Turning now to the drawings wherein like reference characters refer to like and corresponding parts throughout the several views, the belt sanding apparatus is generally designated 10 in FIGS. 1, 2 and 3, and includes a support frame 11 to which a belt sander 12 is mounted in any normal manner. The belt sander includes an endless abrasive belt 13 trained over both a drive roll 14 and a driven idler roll 15 each suitably mounted on the frame for rotation about fixed upstanding axes. A drive motor 16 is operatively coupled to drive roll 14, and the drive roll may be protected by a cover 17. A standard backup platen 18 is mounted on the frame over which the belt passes during either its clockwise or counterclockwise movement between the rolls, as viewed in FIG. 1.

The frame is typically elongated in the longitudinal direction of the belt, and an elongated workpiece support table 19 is located along a side of the frame. Table 19 is mounted in place by a bracket plate 21 mounted on side wall 22 of the frame as by means of a bolt 23 that rotates in and bears on support member 22a (see also FIG. 5). The bolt axis defines a transverse tilt axis (extending perpendicular to the surface of belt) about which the bracket plate may be pivoted (in the direction of double arrow 25) to tilt support table 19 relative to the belt in a manner to be more fully described hereinafter. And, the opposite ends of the bracket Plate have elongated arcuate slots 24, clamp bolts 20 extending through these slots and threading into side wall 22 for clamping the bracket plate in its desired tilt attitude.

Bracket elements 26 are mounted on the underside of table 19, each bracket element having a transverse slot 27 (FIG. 3) through which a clamp bolt 28 extends. Thus, upon loosening these bolts, table 19 can be adjusted in the horizontal direction, as shown by the double arrow 29 of FIG. 3, toward and away from belt sander 13. After the adjustment is made, bolts 28 are simply retightened.

Guide rods 31 extend through collars 32 of bracket plate 21 for sliding vertical movement. Additional bracket elements 33 are mounted at the upper ends of the guide rods and are connected to bracket elements 57 via bolts 34. As seen in FIG. 3, each bracket element 57 has an elongated arcuate slot 35 through which a bolt clamp 36 extends. The common axis of bolts 34 define a longitudinal roll axis about which table 19 can be pivoted, in the direction of the double curved arrow 37 of FIG. 3, relative to the sander. Clamp bolts 36 are simply loosened to facilitate the desired roll adjustment, after which they are simply retightened.

A turnscrew 38 extends through threaded opening 39 of a collar 41 (FIG. 5) of bracket plate 21, and has a turn handle 42 at its lower end. The upper free end of the turnscrew abuts against a bearing plate 43 mounted to the underside of table 19. A clamp bolt 44 engages the turnscrew when tightened for clamping the turnscrew against unthreading when adjusting the height of the workpiece table. Similarly, clamp bolts 45 are tightened against guide rods 31 for clamping them against sliding movement once the workpiece table is adjusted to its desired vertical position.

For vertically adjusting table 19 in the direction of double arrow 46 of FIGS. 2 and 3, bolts 44 and 45 are loosened, and the turnscrew is manually rotated to effect translational movement in the direction of arrow 46 and for thereby raising or lowering table 19 relative to belt 13. During vertical adjustment the guide rods 31 slide within their collars 32 to thereby maintain the table parallel at all times to bracket plate 21.

As aforedescribed, workpiece support table 19 is capable of four-way adjustment relative to sanding belt 13. The table is accurately adjusted vertically upon manual operation of turnscrew 38, and the table is capable of relative adjustment to the belt sander about a transverse tilt axis extending through bolt 23 upon simply loosening clamp bolts 20 thereby allowing for adjustment of bracket plate 21 together with table 19 and guide rods 31 about the tilt axis. After the table is tilted to its intended degree, bolts 20 are simply retightened. Moreover, table 19 is adjustable horizontally along an axis parallel to the tilt axis by simply loosening bolts 28 and retightening them after adjustment. The workpiece table is likewise adjustable about a longitudinal roll axis extending through bolts 34 by simply loosening clamp bolts 36, making the adjustment, and retightening these bolts.

The belt sanding apparatus of the invention may likewise include an end workpiece support table 47 having a cutout 48 to accommodate the bend end of sanding belt 13 as it passes about idler roll 15 (FIG. 1). Table 47 is mounted on end wall 49 of the frame, as more clearly shown in FIGS. 2 and 3. A bracket plate 51 is mounted to a support piece 52 fixed to the end wall. As shown more clearly in FIG. 4, the bracket plate is mounted in place by a bolt 53 defining a transverse tilt axis about which the bracket plate and the connected table 47 can be tilted relative to belt 13 in the direction of double arrow 54 shown in FIG. 3. Bracket plate 51 has curved arcuate slots 55 near its opposite ends through which clamp bolts 56 extend into engagement with the end wall for maintaining the tilt attitude of table 47.

The end table has bracket elements and guide rods depending therefrom similarly as described with reference to side table 19. Thus, bracket elements 26 are mounted on the underside of table 47 (FIG. 3), each of the brackets 57 having an elongated slot 58 (FIG. 2) extending in the direction of double arrow 59. Clamp bolts 61 extend through these slots into engagement with bracket 26 which is fastened to table 47 such that, when loosened, the table can be horizontally adjusted relative to belt 13, after which the bolts are simply retightened.

Guide rods 62 extend through collars 63 located on bracket plate 51. Further bracket elements 64 are fixed to the upper ends of the guide rods and are connected to bracket elements 57 by bolts 65. Each element has an elongated arcuate slot 66 (FIG. 2) through which a clamp bolt 67 extends into engagement with bracket 57. Bolts 65 lie along a common longitudinal roll axis relative to table 47 such that, upon loosening clamp bolts 67, table 47 can be adjusted about its roll axis relative to belt 13, in the direction of double arrow 68 of FIG. 2, whereafter clamp bolts 67 are retightened.

Vertical adjustment of table 47 is carried out slightly differently from that described with reference to the vertical adjustment of side table 19. A turnscrew 69 is mounted on a flange 71 of bracket plate 51 (FIG. 4) for rotation about its central axis but without axial movement. The turnscrew is connected to flange 71 by a nut 72 with bearings 73 on opposite sides of the flange, as shown. And, the turnscrew has a turn handle 74 at its lower end to facilitate manual turning.

A plate 75 innerconnects the lower ends of guide rods 62, has a central opening 76 that is threaded and in engagement with turnscrew 69. Thus, vertical adjustment of table 47 in the direction of double arrow 77 of FIG. 2 can be carried out upon rotation of turnscrew 69 about its central axis which simply moves plate 75 up or down together with guide rods 62 and end table 47 connected thereto.

Clamp bolts 78 are provided for locking the guide rods in place after vertical adjustment.

As with side table 19, end table 47 is capable of four-way adjustment relative to sanding belt 13, i.e., vertical, horizontal, roll and tilt. The critical vertical adjustment is quite stable by reason of the spaced apart guide rods, and adjustment about the transverse tilt axis lends versatility to operation of the sanding apparatus.

Obviously, many modifications and variations of the invention are made possible in the light of the above teachings. For example, other finishing operations than sanding can be carried out with the present apparatus depending upon the type of abrasive endless belt used. And, the vertical adjustment described for side table 19 can likewise be used for the vertical adjustment of end table 47, and vice versa, without departing from the invention. It is therefore to be understood that within the scope of the appended claims the invention may be practiced otherwise than as specifically described.

What is claimed is:

1. A belt sanding apparatus having apparatus having a longitudinally extending, endless belt trained over both a drive roll and a driven roll for finishing a workpiece, said belt having an abrasive surface, the apparatus comprising an elongated support frame, means for mounting said rolls on said frame for rotation about fixed upstanding axes, a workpiece support table on said frame, means for mounting said table to said frame for four-way adjustment relative to said belt, said means comprising an elongated support bracket plate mounted on said frame for pivotal movement about a transverse tilt axis extending perpendicular to the belt surface, guide means connected to said table and being in engagement with said bracket plate for vertical sliding movement and for pivotal movement together with said table about said transverse tilt axis, moving means on said bracket for vertically moving said table along an axis parallel to said belt surface, means connecting said table to said guide means for effecting movement of said table both along a horizontal axis parallel to said transverse tilt axis and about a roll axis extending parallel to said belt, whereby said table is capable of vertical, horizontal, tilt and roll adjustments relative to said belt.

2. The apparatus according to claim 1, wherein said table is located along a side of said frame.

3. The apparatus according to claim 1, wherein said table is located along an end of said frame.

4. The apparatus according to one of claims 2 and 3, wherein said vertical moving means bears against an underside of said table to effect direct vertical movement of said table.

5. The apparatus according to claim 4, wherein said vertical moving means comprises a turnscrew in threaded engagement with said bracket plate.

6. The apparatus according to one of claims 2 and 3, wherein said vertical moving means engages said guide means for vertically moving said guide means and said table.

7. The apparatus according to claim 6, wherein said vertical moving means comprises a turnscrew mounted on said bracket plate for rotatable movement about a central axis of said turnscrew.

8. The apparatus according to claim 5, wherein said guide means comprise guide rods located on opposite sides of said turnscrew.

9. The apparatus according to claim 7, wherein said guide means comprise guide rods located on opposite sides of said turnscrew.

10. The apparatus according to claim 1, wherein said connecting means include first bracket elements having elongated openings for movement of said table along said horizontal axis.

11. The apparatus according to claim 10, wherein said connecting means further include second brackets on said guide means, said second brackets having elongated openings for movement of said table about said longitudinal roll axis.

* * * * *